United States Patent [19]

Bigo

[11] Patent Number: 4,997,066
[45] Date of Patent: Mar. 5, 1991

[54] WHEEL-LOCKING DEVICE, IN PARTICULAR FOR A PRAM

[75] Inventor: Jean Bigo, Cholet, France

[73] Assignee: Ampafrance, Boulogne-Billancourt, France

[21] Appl. No.: 397,848

[22] Filed: Aug. 23, 1989

[30] Foreign Application Priority Data

Aug. 29, 1988 [FR] France ................................ 8811338

[51] Int. Cl.⁵ .............................................. B60T 1/06
[52] U.S. Cl. ........................................ 188/31; 188/20; 188/69
[58] Field of Search ................... 188/1 R, 2 R, 20, 31, 188/69; 280/688

[56] References Cited

U.S. PATENT DOCUMENTS

| | | | |
|---|---|---|---|
| 809,341 | 1/1906 | Viola | 188/31 |
| 1,875,096 | 8/1932 | Miller | 188/69 |
| 2,988,175 | 6/1961 | West | 188/69 X |
| 3,174,768 | 3/1965 | Sanders et al. | 188/31 X |
| 4,392,668 | 7/1983 | Mulholland | 280/688 X |

FOREIGN PATENT DOCUMENTS

| | | |
|---|---|---|
| 0064368 | 11/1982 | European Pat. Off. . |
| 381947 | 9/1923 | Fed. Rep. of Germany ........ 188/31 |
| 2351435 | 4/1975 | Fed. Rep. of Germany . |
| 2548608 | 1/1985 | France . |
| 2197042 | 5/1988 | United Kingdom . |

Primary Examiner—Duane A. Reger
Attorney, Agent, or Firm—Oblon, Spivak, McClelland, Maier & Neustadt

[57] ABSTRACT

Wheel-locking device, in particular for a pram, which includes at least one wheel unit (4) and a wheel-locking member capable of being displaced substantially parallel to the axle of the wheel and of coming into contact with the wheel rim in order to lock its rotational position, wherein the wheel unit (4) is linked to the frame of the pram by means of a vertical linking sleeve (12) and in that the locking member includes a movable finger (14a, 14b) actuated by a control shaft (15) which moves vertically inside the linking sleeve. A single action on the flexible rod 18 therefore simultaneously locks the two pivoting wheel units of the axle beam 3 in terms of rotation. In one embodiment, the same wheel units may be locked in a fixed direction by means of locking parts (32, 33) interacting with the notches (30) of the linking sleeve (12).

12 Claims, 4 Drawing Sheets

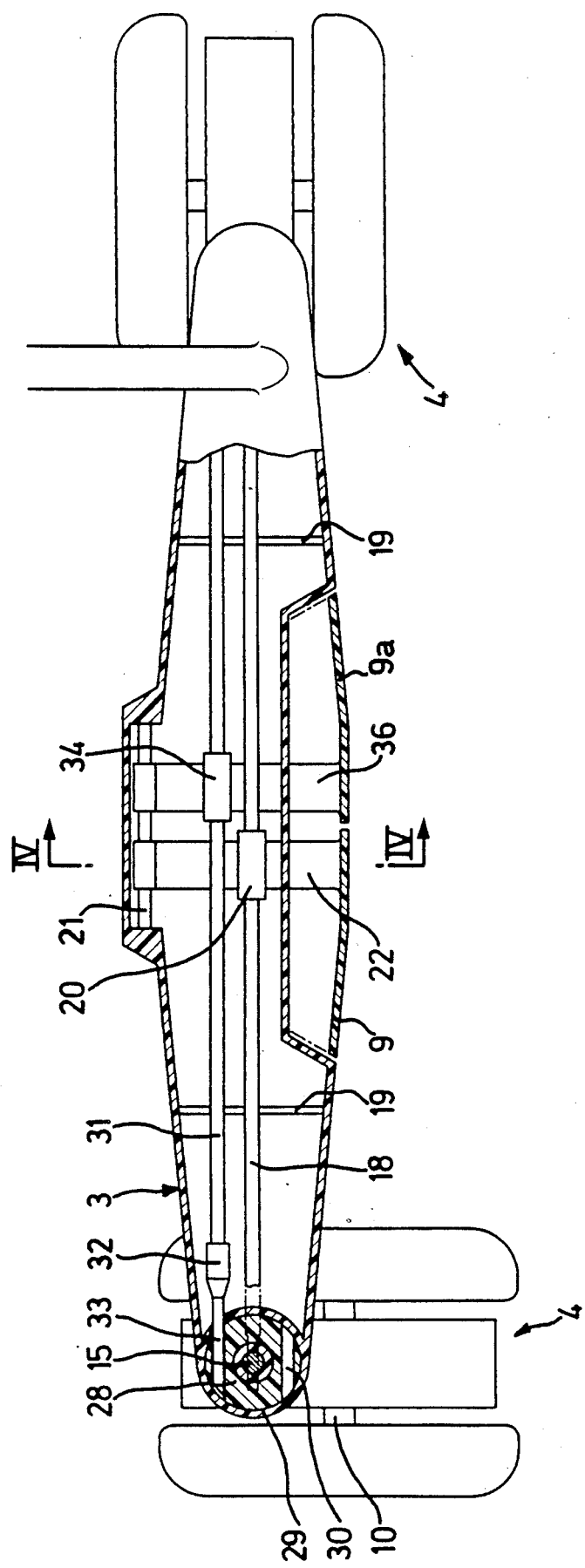

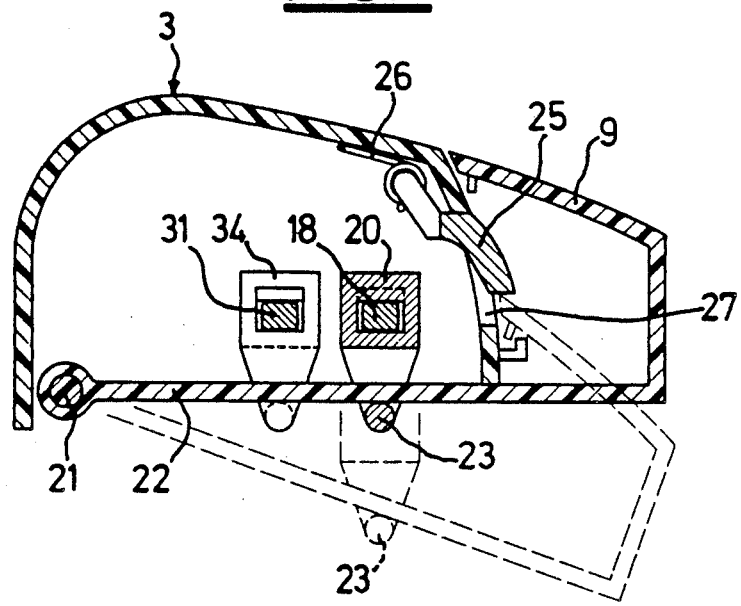
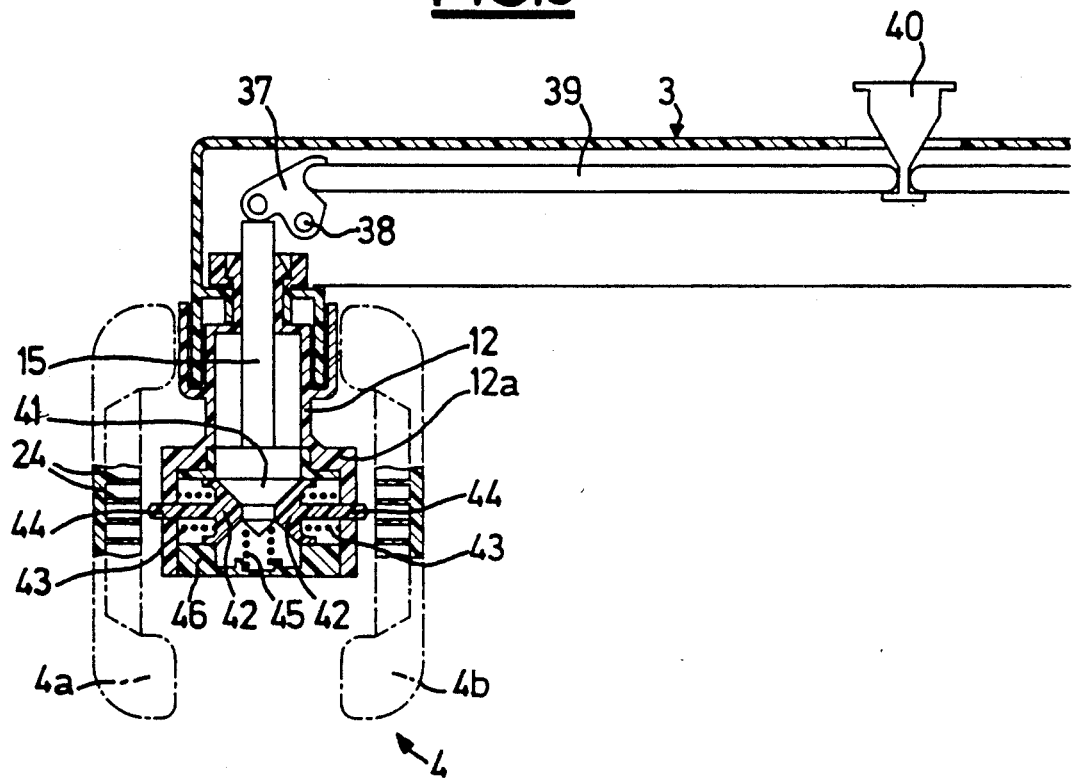

WHEEL-LOCKING DEVICE, IN PARTICULAR FOR A PRAM

BACKGROUND OF THE INVENTION

1. Field of the Invention

The present invention relates to a wheel-locking device which may be used, in particular, for prams and which is capable of simultaneously locking the rotation of several wheels. In the case of directional wheels, the device of the invention also makes it possible to lock the pivot position of the wheels using additional means.

1. Discussion of the Background

Wheel-locking or wheel-braking devices are already known in which a locking element is displaced axially or radially so as to be inserted between two spokes of the wheel or to act on its hub. Mention may be made, for example, of French Pat. 8,412,509 (AMPAFRANCE), Patent US-A-4,116,464, German Pat. Application DE-2,351,435 (MULLER) or European Pat. Application EP-64,368 (KIRK-DYSON). In other braking devices of known type, the tyre of the wheel is acted upon radially using the flexibility of this tire such as described, for example, in French Pat. 8,502,374 (AMPAFRANCE).

In all these locking or braking devices, it is possible to act simultaneously on the two wheels or on the two sets of wheels of one and the same axle only if these wheels are not orientable. In the case where orientable wheels are provided at the front, in the case of a child's push-chair, the braking device is then usually disposed on the two non-orientable wheels linked to the rear axle.

Also known are braking devices intended to act on a directional wheel unit capable of pivoting about a vertical axis. However, in these devices, the locking means are designed individually for each wheel or each wheel unit such that it is necessary to act on two control means in order to completely lock the pivoting of the directional wheels of the push-chair or of the pram.

SUMMARY OF THE INVENTION

The subject of the present invention is a wheel-locking device which can act simultaneously on the two directional wheels or on the two orientable, directional wheel units of one and the same axle using a single control.

A further subject of the invention is a wheel-locking device which can easily be mounted in the vicinity of one or other of the axles of a pram so as to permit a locking action on the front axle or on the rear axle or on both axles by fitting two locking devices according to the invention, which thus makes it possible to increase the flexibility of use of the pram.

A further subject of the invention is to provide a direction locking device capable of acting on two directional wheel units on one and the same axle, it being possible for this device to be combined with the wheel-locking device according to the invention, on the same axle, so as to permit, by means of two controls which are close to one another, not only locking of the wheels in rotation thereof, which allows forward movement of the push-chair, but also locking of their pivoting position about the vertical axis which is integrally attached to the frame of the push-chair in order to return them to the normal, predetermined, fixed direction.

The wheel-locking device, in particular for a pram, according to the invention comprises at least one wheel unit and a wheel-locking member capable of being displaced substantially parallel to the axle of the wheel and of coming into contact with the wheel rim in order to lock its rotation. According to the invention, the wheel unit is linked to the frame of the pram by means of a vertical linking sleeve. The locking member comprises a movable finger actuated by a control shaft which moves vertically inside the linking sleeve.

In the case where the pram comprises at least two wheel units linked by a substantially transverse frame element, the respective control shafts of each wheel unit are simultaneously actuated by a control rod which is substantially parallel to the transverse frame element.

In an advantageous embodiment of the invention, the vertical linking sleeve of each wheel unit supports, moreover, a resilient suspension means for the wheel axle. In this manner, it is possible to produce a compact assembly using a smaller number of parts providing both the suspension and the locking of the wheels.

In a preferred embodiment where each wheel unit comprises two wheels mounted on either side of the vertical linking sleeve, the locking member comprises two movable fingers actuated simultaneously by the control shaft. The two wheels of the wheel unit are thus simultaneously locked.

In an advantageous embodiment, the lower end of the control shaft has at least one cam surface exerting a separating effect on the locking finger or fingers against a resilient return means. The control rod may be a flexible strip which can be fitted, for example, actually inside the transverse frame element which resembles a beam. The flexible strip may be deformed near its center by a control pedal so as to cause simultaneous displacement of its two ends upwards, thus acting simultaneously on the respective control shafts of the two wheel units. In this manner, during locking action, the two control shafts are displaced upwards and their cam surfaces in the form of an inclined ramp are capable of separating the ends of two flexible, resilient branches carrying the locking fingers. A single action on the control pedal causing the deformation of the flexible strip thus causes, simultaneously, the locking action on the two wheel units which takes place regardless of their orientation when directional, pivoting wheel units are involved.

In the case where the wheel units are of a directional type and can pivot freely with respect to the frame of the pram, each wheel unit is mounted with a view to its pivoting movement about the axis of the vertical linking sleeve.

In this case, the vertical linking sleeve has, in its upper part, at least one notch capable of interacting with a part for locking in rotation whose displacement is controlled by the flexion of a second control rod. An action by means of an appropriate pedal on this second control rod thus causes the displacement of the locking parts. When the vertical linking sleeve of the directional wheel unit, which rotates because of the displacement of the pram, arrives in an angular position in which the notch it carries can interact with the locking part, the wheel unit is locked in position.

The single control action on the pedal thus makes it possible, very rapidly, to hold the two directional wheel units in a predetermined direction.

BRIEF DESCRIPTION OF THE DRAWINGS

The invention will be better understood by studying a few embodiments which are described by way of examples which in no way limit the invention and which are illustrated in the drawings, in which:

FIG. 3 is a plan sectional view taken along III—III of FIG. 2;

FIG. 4 is a transverse sectional view along IV—IV of FIG. 3, illustrating the structure of the control pedal of the locking device of the invention; and FIG. 5 is a partly sectional view, similar to FIG. 2, of an alternative embodiment.

DESCRIPTON OF THE PREFERRED EMBODIMENTS

Figure 1:
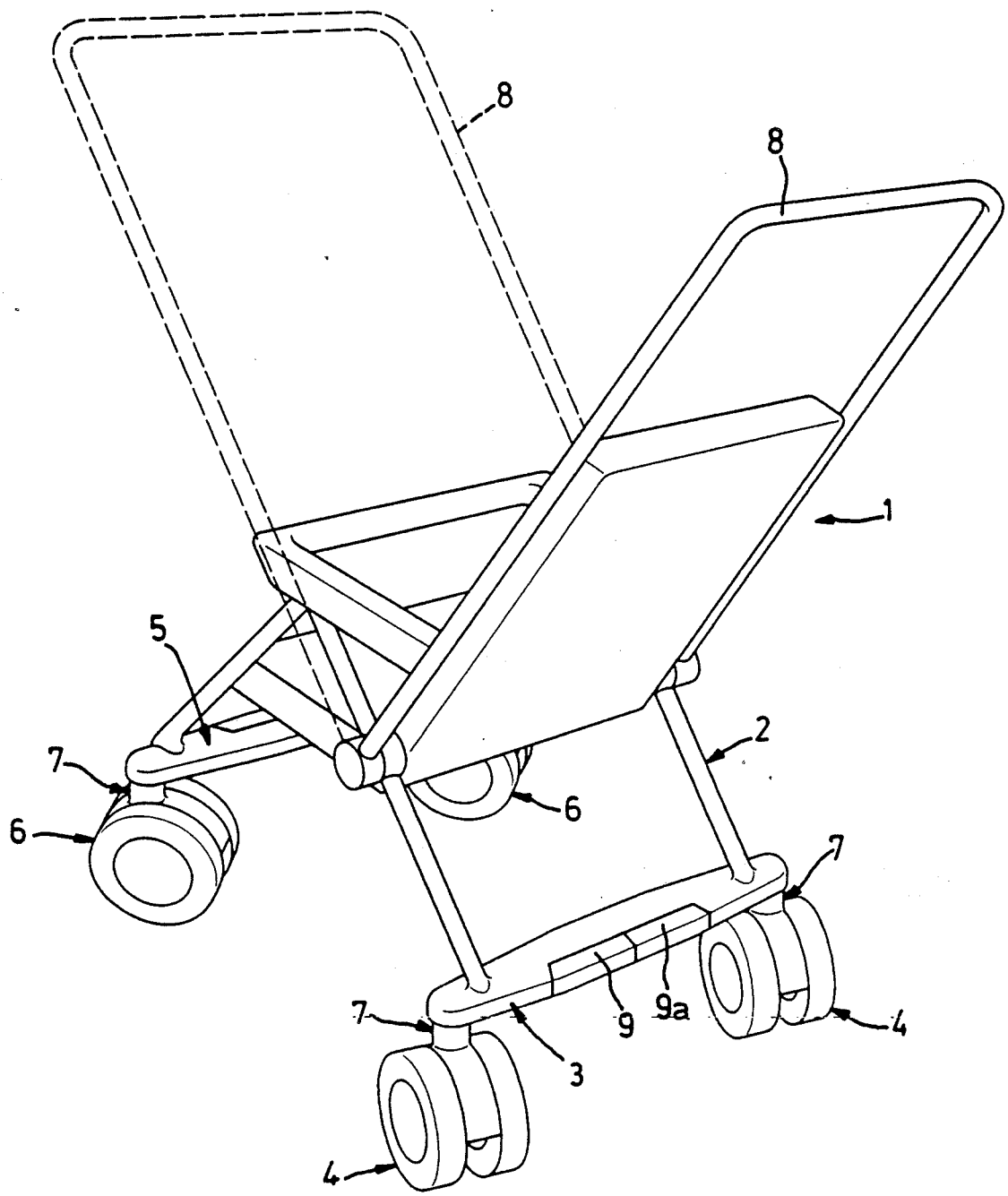
FIG. 1 is a diagrammatic perspective view of a push-chair equipped with a locking device according to the invention.

As illustrated in FIG. 1, the device of the invention may be fitted to a pram or a push-chair. This is, of course, only one example and the invention could be applied to other vehicles, such as trolleys, wheelchairs, etc. In the figure, the push-chair, referenced 1 overall, has a tubular frame equipped with a beam forming a rear axle 3, supporting two rear wheel units 4 and a beam forming a front axle 5, supporting two front wheel units 6. In the example illustrated, each of the four wheel units 4, 6 may pivot freely about a vertical pivot axis which consists here of a single part 7 which forms both the pivot and the suspension for the push-chair, as will be seen hereinafter. Of course, it could be the case that some wheel units are fixed in terms of direction, the locking device of the invention also being applicable in this case.

As may be seen in FIG. 1, the push-chair also comprises a handle 8 which may be placed in the position illustrated in solid lines, in which the child in the push-chair is seated with his back turned towards the person who is pushing him, or in another position illustrated in dotted lines in the figure, in which the child is seated facing the person who is pushing him. Locking means, not shown, are provided to hold the handle 8 in each of these two positions. It will be noted that the wheel units 4, 6 are thus alternatively and according to the position of the handle 8 at the rear or at the front.

The wheels 4 are locked in rotation by means of a simple pushing action on the pedal 9 located on the rear axle beam 3. In order to keep the wheel units 4 fixed in terms of direction, the pedal 9a, which is located beside the pedal 9, is, on the contrary, actuated. Identical control pedals are provided on the front axle beam 5.

Figure 2:
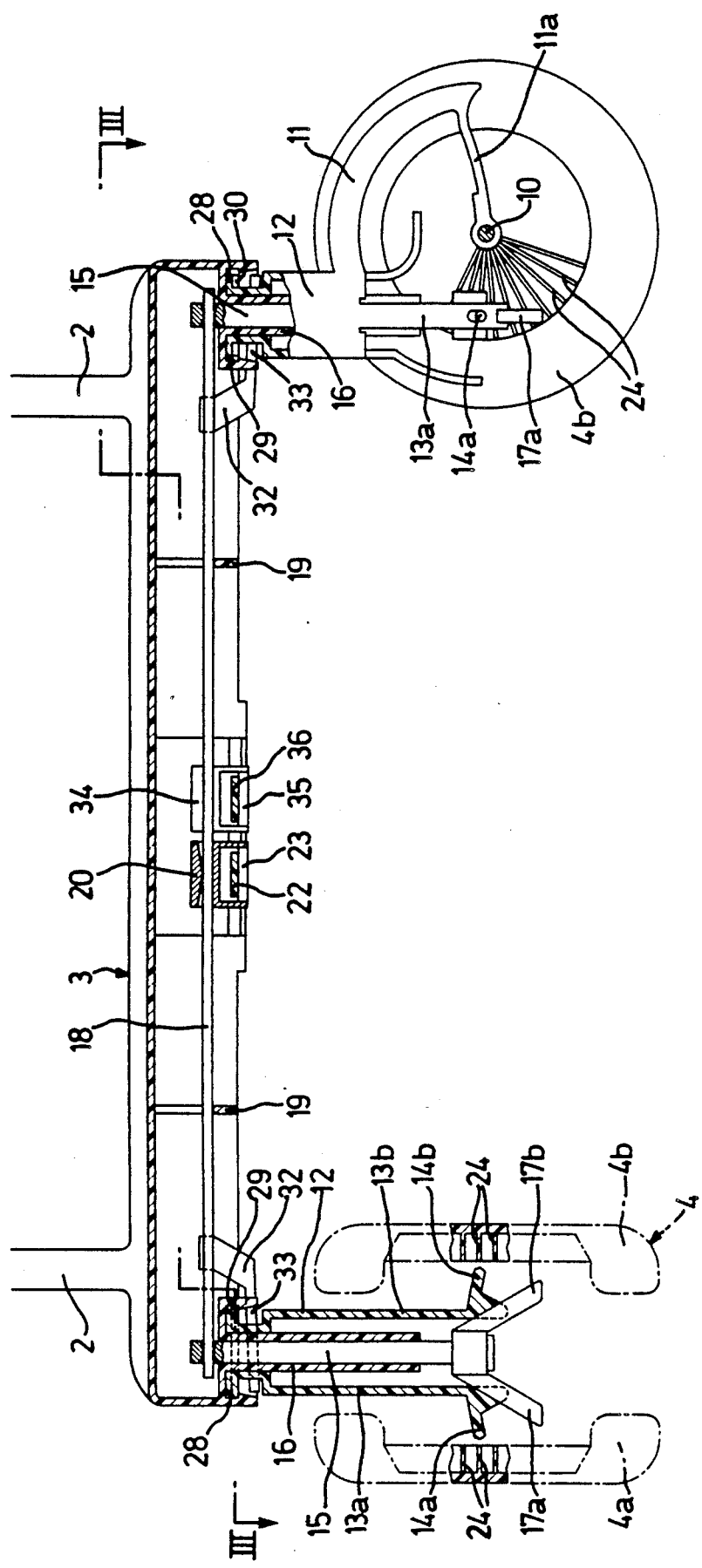
FIG. 2 is a sectional view of one axle of the push-chair of FIG. 1, showing, in two particular positions of each wheel unit, various members of the device of the invention.

With reference to FIGS. 2, 3 and 4, a description will now be provided of the structure and the operation of the wheel-locking device of the invention. The description will be made based on the device equipping the rear axle beam 3 equipped with the two rear wheel units 4. It will, of course, be understood that the structure and the operation of the device for locking the front wheel units 6 are the same.

The wheel unit 4 comprises two wheels 4a, 4b mounted on a common horizontal spindle 10 which can rotate in a bore of radial arm 11a integrally attached to a semicircular flexible strip 11 of a vertical linking sleeve 12 of tubular structure. The flexible strip 11 and the arm 11a, which are made, for example, from moulded plastic material, form the flexible suspension of the push-chair. The sleeve 12 has, on its outer faces opposite the respective wheels 4a, 4b, two flexible tongues 13a, 13b which are diametrically opposite. Each tongue 13a, 13b has, at its end, a locking finger 14a, 14b which is substantially parallel to the spindle 10. A control shaft 15 is fitted with a view to a vertical to and fro displacement inside the guide pin 16 which is integrally attached to the structure of the axle beam 3. Two inclined ramps 17a, 17b, acting as cam surfaces and interacting with the free ends of the two tongues 13a, 13b, are fixed at the lower end of the control shaft 15.

A flexible control rod 18 extends over the entire length of the axle beam 3 and penetrates at both its free ends into a hole made in the upper end of each of the control shafts 15. The rod 18, moreover, bears on two support ribs 19 in the axle beam 3 substantially at an equal distance between the median zone of the rod 18 and its two ends. A calliper 20 surrounds the rod 18 near its median region. As may be seen, in particular, in FIG. 4, the control pedal 9 may pivot about a spindle 21 which is integrally attached to the axle beam 3. The lower face 22 of the pedal 9 is in contact with a shaft 23 which is integrally attached to the calliper 20.

The locking device of the invention operates in the following manner. A pushing action, for example with the foot, on the pedal 9 to displace it from the position shown in solid lines in FIG. 4 to the position shown in dotted lines causes the downward displacement of the shaft 23 and a pushing backwards, by means of the calliper 20, of the central part of the flexible control rod 18. The control rod 18 flexes between the two support ribs 19 so that its two ends are raised upwards, thereby, simultaneously with this movement, moving the two control shafts 15. The two control shafts 15 are displaced vertically upwards, being guided inside the guide pin 16, and, by means of the action of the cams 17a, 17b which are also moved upwards, they cause the simultaneous separation of the movable locking fingers 14a, 14b which are inserted into a recess formed between two spokes 24 of the wheels 4a, 4b, thereby locking the latter in rotation.

The device is held in the locking position by the pedal 9 being clipped into this position by means of the clipping lug 25 (FIG. 4) which can pivot about an axis against the return spring 26. As may be seen in FIG. 4, the downward movement of the pedal 9 retracts the clipping lug 25 into a recess 27 made in the outer surface of the axle beam 3, and then, after overlapping, the lug 25 returns to its position illustrated in FIG. 4, locking the pedal 9 in its position illustrated in dotted lines.

In this position where the control rod 18 is always flexed, it will be understood that the wheellocking device is active, preventing any rotation of the wheels. On the other hand, the pivoting of the wheel units 4 about their vertical axis, that is to say the rotation of the linking sleeves 12, with respect to the axle beam 3, still remains possible.

A pushing action, for example with the foot, on the clipping lug 25 frees the pedal 9 which automatically returns to its position due to the elasticity of the control rod 18 which assumes its unflexed position illustrated in FIG. 2, in which the movable locking fingers 14a, 14b have returned in the direction of the shaft 15 where they do not interfere with the spokes 24 of the wheels 4a, 4b.

In the embodiment illustrated in the figures, the rear axle beam 3 also comprises, although this is not essential in every case, means making it possible to keep the two wheel units 4, which are normally pivoting, as has been seen above, in a fixed direction. To this end, the upper part of the linking sleeve 12 comprises a collar 28 at the top thereof. The collar 28 may rotate inside a recess 29 integrally attached to the structure of the axle beam 3, thereby ensuring the pivoting of the wheels 4 about the vertical axis of the linking sleeve 12. The lower face of the collar 28 comprises two parallel notches 30 which are visible in FIGS. 2 and 3. A second flexible control rod 31 is fitted inside the axle beam 3, parallel to the rod 18. In the vicinity of these two ends, the control rod 31 has two parts 32 for locking in rotation which are integrally attached to the rod 31 and one elongated branch 33 of which can pass through a passage in the circular recess 29 and interact with one of the notches 30.

As may be seen in FIG. 3, the control rod 31 with its part 32 for locking in rotation is offset with respect to the rod 18 which interacts with the two control shafts 15 so that the branches 33 can penetrate into one of the ribs 30. In this position which is illustrated in FIG. 3, any rotation of the linking sleeve 12 is prevented by the branch 33 of the locking part 32 which interacts with one of the notches 30 in the collar 28. The wheel unit 4 located on the left in Figure 3 is locked in the direction perpendicular to the axle beam 3 because the notches 30 are parallel to the spindle 10 of the wheel unit 4.

The control rod 31 is actuated like the control rod 18. To this end, the rod 31 also bears on the two ribs 19 and may be actuated by means of a calliper 34 whose structure is identical to that of the calliper 20 and which comprises, like the latter, a shaft 35 which interacts with the lower face 36 of the pedal 9a.

In these conditions, when it is desired to return the two wheel units into the predetermined position, perpendicular to the axle beam 3, as illustrated on the left of FIG. 3, the foot is pressed on the pedal 9a which remains locked by a means which is not shown, identical to that which is illustrated in FIG. 4 for the pedal 9. The pressing action in the central zone of the flexible control rod 31 by means of the calliper 34 causes a flexion in contact with the two support ribs 19, which raises the two ends of the rod 31 as well as the parts 32 for locking in rotation which are integrally attached thereto. The elongated branches 33 come into contact with the lower face of the collar 28 and rub resiliently against this face until the rotation of the wheel unit 4 has brought one of the ribs 30 opposite the branch 33 of the part 32 for locking in rotation which then penetrates in the said rib while keeping the wheel unit 4 in the position illustrated on the left in FIG. 3.

The position illustrated on the right in FIG. 3 for the right-hand wheel unit 4 is thus a temporary position, the said wheel unit having to be returned parallel to the left-hand wheel unit when the part 32 for locking in rotation located on the right in FIG. 3 has penetrated into the groove 30 of the corresponding linking sleeve 12. A single action on the pedal 9a therefore makes it possible, very rapidly, to return the two wheel units 4 into the predetermined direction and to lock them in this fixed direction. Release of the pedal 9a, on the other hand, frees the two wheel units.

FIG. 5 illustrates an alternative embodiment of the invention in which similar parts have the same references. In this alternative embodiment, there is a wheel unit 4 fitted on a vertical linking sleeve 12. The control shaft 15 may be displaced vertically inside the sleeve 12. This displacement is caused by a lever 37 which can pivot about a fixed axis 38 through the action of a control bar 39 which can be displaced outwards (towards the left in FIG. 5) when a part forming a cam 40 is pressed inside the axle beam 3.

At the bottom, the control shaft 15 has a conical head 41 which acts as a cam surface for two pistons 42 with a conical outer surface and which are returned by means of helical springs 43 and which have rods 44 which can project outside the lower portion 12a of the linking sleeve 12 until they are located between two spokes 24 of the wheels 4a and 4b, thereby producing locking of the wheels in terms of rotation.

Although not essential in every case, in the example illustrated a return spring 45 is, moreover, fitted between the lower wall 46 of the linking sleeve 12 and the lower end of the control shaft 15 so as to return the control shaft 15 upwards in order to facilitate the disengagement of the locking rods 44.

In this embodiment, as illustrated in FIG. 5, no device for holding the wheel units in terms of direction has been shown. However, it will be understood that a device similar to that which has been described for the embodiment illustrated in FIGS. 2 and 3 could be used to achieve the same result.

The device of the invention therefore makes it possible, simply and with a single control, to efficiently and simply lock the two wheels or the two wheel units, which may be pivoting, fitted on and the same axle of a push-chair or of a pram or of any other light vehicle posing the same wheel-locking problem.

In the present description, there have been several mentions of the existence of wheel units, that is to say assemblies having two wheels disposed side by side. It will be understood that the invention is applicable without substantial modification in the case where these wheel units are replaced by individual wheels.

What is claimed is:

1. A wheel-locking device for a manually propelled vehicle which comprises:

at least two freely orientable wheel units, each wheel having a rim with a plurality of recess means formed therein;

a vertical sleeve member for each said wheel unit which is freely rotatably mounted on said vehicle for rotating around vertical axis and having means for attaching thereto a horizontal spindle for mounting said wheel;

a control shaft mounted inside said vertical sleeve member for vertical movement between two positions;

locking means for being moved in a direction substantially parallel to said horizontal spindle in response to said vertical movement of said control shaft; and manually actuatable control means for simultaneously acting on each control shaft so as to move said locking members to cooperate with said recess means of both wheel unit irrespective of their orientation.

2. A wheel-locking device for a manually propelled vehicle which comprises:

at least two freely orientable wheel units, a wheel of each of said wheel units having a rim with a plurality of recesses formed therein;

a vertical sleeve member for each said wheel unit which is freely rotatable mounted on said vehicle for rotating around a vertical axis and having means for attaching thereto a horizontal spindle for mounting said wheel;

at least one locking finger means resiliently mounted near a lower end of said sleeve member;

a control shaft mounted inside said sleeve member for vertical movement, said control shaft having at least one cam surface means for urging said locking finger means toward said recesses of said wheel when said control shaft is moved from a first position to a second position.

3. A wheel-locking device for a manually propelled vehicle which comprises:
  at least two freely orientable wheel units, each wheel unit including two wheels having a rim with a plurality of recesses formed therein;
  a vertical sleeve member for each said wheel unit extending between the two wheels of each wheel unit which is freely rotatably mounted on said vehicle for rotating around a vertical axis and having means for attaching thereto two horizontal spindles for mounting said wheels;
  a control shaft with a lower and an upper end mounted inside said vertical sleeve member for vertical movement between two positions, said control shaft having near a lower end thereof two cam surface means;
  first and second flexible tongues fitted on said vertical sleeve member and each having locking finger means, said tongues cooperating with said cam surface means for urging said locking finger means towards said recesses of said wheels of said wheel units when said control shaft is moved from one position to another.

4. Wheel locking device according to claims 2 or 3, which comprises a substantially transverse frame element linked to at least one of said wheel units, wherein respective control shafts of each wheel unit are simultaneously actuated by a control rod which is substantially parallel to the transverse frame element.

5. Wheel-locking device according to claims 1, 2 or 3, wherein the vertical linking sleeve also supports resilients suspension menas for the wheel axle.

6. Wheel-locking device according to claims 1, 2 or 3, wherein each of the wheel units comprises two wheels mounted on either side of the vertical linking sleeve.

7. Wheel-locking device according to claim 1, 2 or 3, wherein the locking means comprises two movable fingers actuated simultaneously by the control shaft.

8. Wheel-locking device according to claims 1, 2, or 3 wherein the lower end of the control shaft has at least one cam surface for exerting a separating effect on the locking finger or fingers against a resilient return means.

9. Locking device according to 1, 2, or 3, wherein the control rod comprises a flexible strip fitted inside the transverse frame element, deformation of the said strip near a center portion thereof causing a simultaneous displacement of two ends thereof which act on the respective control shafts of the two wheel units.

10. Wheel-locking device according to claim 1, 2 or 3, wherein, for locking action, the control shaft is displaced upwards, the cam surface thereof being in the form of an inclined ramp capable of separating the ends of two resilient branches for carrying the locking fingers.

11. Wheel-locking device according to claims 1, 2 or 3, wherein each wheel unit is freely pivotable about the axis of the vertical linking sleeve.

12. Wheel-locking device according to claim 1, 2 or 3, which comprises a second control rod wherein the vertical linking sleeve has, in an upper part thereof, at least one notch for interacting with a member for locking in rotation, whose displacement is caused by said second control rod.

* * * * *